US008744786B2

(12) United States Patent
Lin

(10) Patent No.: US 8,744,786 B2
(45) Date of Patent: Jun. 3, 2014

(54) DETECTING SYSTEM FOR HOST VIBRATION TEST AND RELATED METHOD

(75) Inventor: Yi-Jiun Lin, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 354 days.

(21) Appl. No.: 13/241,252

(22) Filed: Sep. 23, 2011

(65) Prior Publication Data

US 2012/0310554 A1 Dec. 6, 2012

(30) Foreign Application Priority Data

Jun. 2, 2011 (TW) .............................. 100119362 A

(51) Int. Cl.
*G06F 17/00* (2006.01)
*G01M 1/14* (2006.01)
*B01F 11/00* (2006.01)

(52) U.S. Cl.
USPC ............................. 702/56; 73/1.82; 366/111

(58) Field of Classification Search
USPC ......... 702/56, 33, 81, 84, 108, 113–115, 127, 702/141, 182, 189; 73/1.37, 1.82, 12.01, 73/12.07, 488, 493, 496, 570, 577, 649, 73/662–664, 666, 669; 366/108, 111–112, 366/114; 700/95, 108–109, 275, 280
See application file for complete search history.

(56) References Cited

U.S. PATENT DOCUMENTS 3,100,393 A * 8/1963 Bell ................................. 73/664
3,710,082 A * 1/1973 Sloane et al. ................. 700/280

OTHER PUBLICATIONS

Yu et al., Finite Element Based Fatigue Life Prediction for Electronic Components under Random Vibration Loading, 2010 Electronic Components and Technology Conference, pp. 188-193.*
Al-Yafawi et al., Random Vibration Test for Electronic Assemblies Fatigue Life Estimation, 2010 IEEE, 7 pp.*

* cited by examiner

*Primary Examiner* — Toan Le
(74) *Attorney, Agent, or Firm* — Winston Hsu; Scott Margo

(57) ABSTRACT

A method for host vibration test is disclosed in the present invention. The method includes outputting an initial power spectrum density to a testing platform by a data acquisition device so as to vibrate the testing platform according to the initial power spectrum density. A host is disposed on a supporter, and the supporter is set on the testing platform. The method further includes installing a first accelerometer on the supporter, generating a first power spectrum density according to data detected by the first accelerometer, installing a second accelerometer on the testing platform, generating a second power spectrum density according to data detected by the second accelerometer, and the data acquisition device executing the vibration test of a host according to the first power spectrum density and the second power spectrum density.

19 Claims, 5 Drawing Sheets

DETECTING SYSTEM FOR HOST VIBRATION TEST AND RELATED METHOD

BACKGROUND OF THE INVENTION

1. Field of the Invention

The present invention relates to a system for vibration test and a related method, and more particularly, to a detecting system for single host vibration test and a related method.

2. Description of the Prior Art

Conventional method of host vibration test is installing a plurality of hosts on a rack, and the rack is disposed on a testing platform via a supporter. Procedures of the conventional vibration test includes outputting an initial power spectrum density to the testing platform by a data acquisition device for vibrating the testing platform according to the initial power spectrum density, installing an accelerometer on the testing platform, outputting a parameter, such as acceleration, detected by the accelerometer to the data acquisition device, and then comparing the parameter with the initial power spectrum density from the data acquisition device by a processor. The data acquisition device can generate feedback according to difference between the parameter and the initial power spectrum density, so that vibration of the testing platform can conform to the initial power spectrum density for analyzing whether the host is under standard in a situation of the initial power spectrum density. However, the conventional vibration test is executed at the rack and the plurality of hosts simultaneously, so the measurement cost is expensive and the testing period is long. Therefore, design of a detecting system for vibration test and a related detecting method with greater efficiency, rapid testing period for decreasing the detecting cost is necessary.

SUMMARY OF THE INVENTION

The present invention provides a detecting system for single host vibration test and a related method for solving above drawbacks.

According to the claimed invention, a method for host vibration test includes outputting an initial power spectrum density to a testing platform by a data acquisition device so as to vibrate the testing platform according to the initial power spectrum density, generating a first power spectrum density according to data detected by a first accelerometer disposed on a supporter, wherein the supporter is disposed on the testing platform, generating a second power spectrum density according to data detected by A second accelerometer disposed on the testing platform, and executing the vibration test of a host according to the first power spectrum density and the second power spectrum density by the data acquisition device.

According to the claimed invention, the method further includes generating a third power spectrum density according to data detected by the third accelerometer disposed on a host, wherein the host is disposed on the supporter.

According to the claimed invention, the third power spectrum density is a function of the first power spectrum density and the second power spectrum density.

According to the claimed invention, generating the first power spectrum density according to data detected by the first accelerometer includes outputting a first parameter detected by the first accelerometer to the data acquisition device, and transforming the first parameter into the first power spectrum density from the data acquisition device by a processor.

According to the claimed invention, transforming the first parameter into the first power spectrum density from the data acquisition device by the processor includes analyzing an initial frequency interval of the initial power spectrum density, outputting a frequency spectrum according to the first parameter and segmenting the frequency spectrum into a plurality of sub-intervals according to the initial frequency interval, dividing a dimension of each sub-interval by bandwidth of each sub-interval for obtaining a plurality of parameters, calculating a central frequency of each sub-interval, and generating the first power spectrum density according to the plurality of parameters and the central frequency of the plurality of sub-intervals.

According to the claimed invention, the method further includes outputting a second parameter detected by the second accelerometer to the data acquisition device, transforming the second parameter into the second power spectrum density from the data acquisition device by a processor, and comparing the initial power spectrum density with the second power spectrum density for generating feedback by the processor, so as to control the data acquisition device to drive the testing platform in a mode conforming to the initial power spectrum density.

According to the claimed invention, executing the vibration test of the host according to the first power spectrum density and the second power spectrum density by the data acquisition device includes outputting the first power spectrum density to a frame disposed on the testing platform by the data acquisition device so that the frame and the host disposed on the frame are vibrated according to the first power spectrum density, outputting the second power spectrum density to the testing platform by the data acquisition device so that the testing platform is vibrated according to the second power spectrum density, generating a verification power spectrum density according to a data detected by a host accelerometer disposed on the host, comparing the verification power spectrum density with the third power spectrum density, and generating a host testing power spectrum density according to a comparison.

According to the claimed invention, generating the verification power spectrum density according to the data detected by the host accelerometer disposed on the host includes outputting a parameter detected by the host accelerometer to the data acquisition device, and transforming the parameter into the verification power spectrum density from the data acquisition device by a processor.

According to the claimed invention, comparing the verification power spectrum density with the third power spectrum density includes the verification power spectrum density being the host testing power spectrum density when the verification power spectrum density is substantially greater than or equal to the third power spectrum density.

According to the claimed invention, comparing the verification power spectrum density with the third power spectrum density includes gaining the verification power spectrum density when the verification power spectrum density is substantially smaller than the third power spectrum density, modifying the first power spectrum density and the second power spectrum density according to the verification power spectrum density which is gained, and comparing the gained verification power spectrum density with the third power spectrum density.

According to the claimed invention, a detecting system for host vibration test includes a first accelerometer installed on a frame for detecting vibration frequency of the frame, a second accelerometer installed on a testing platform for detecting vibration frequency of the testing platform, and the frame is disposed on the testing platform. The detecting system further includes a third accelerometer installed on a host for detecting vibration frequency of the host, and the host is disposed on the frame. The detecting system further includes a data acquisition device coupled to the first accelerometer, the second accelerometer and the third accelerometer for respectively outputting a first power spectrum density and a second power spectrum density to the frame and the testing platform, and a processor electrically connected to the data acquisition device for controlling the data acquisition device to respectively drive the frame and the testing platform according to data detected by the first accelerometer and the second accelerometer, and further for comparing a third power spectrum density detected by the third accelerometer with a verification power spectrum density, and executing a host vibration test according to a comparison.

The present invention can execute the vibration test for single host, and accurately simulate the situation the same as the multi-host vibration test (the rack with the plurality of hosts) by analyzing and comparing the corresponding power spectrum density for preferable reliability. That is to say, the vibration test of the present invention can be executed for the single host in the simulating situation as the supporter with the plurality of hosts, so the complicated procedures and labor work of conventional installation are omitted. Thus, the detecting system for the single host vibration test and the related method of the present invention can effectively simplify apparatus design and reduce testing period, and has advantages of greater efficiency and low production cost.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
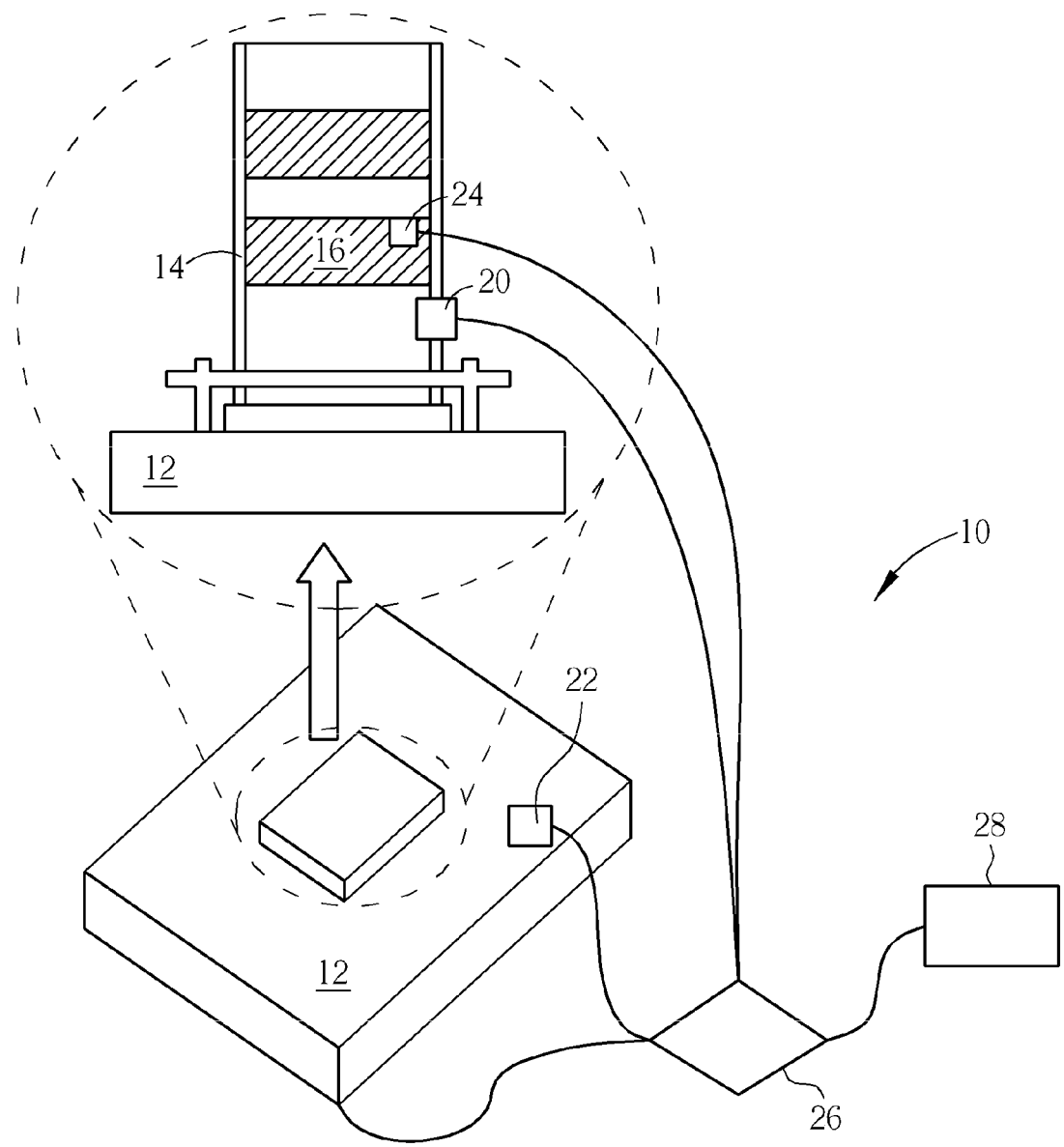
FIG. 1 and FIG. 2 are diagrams of a detecting system in different periods according to an embodiment of the present invention.
Figure 2:
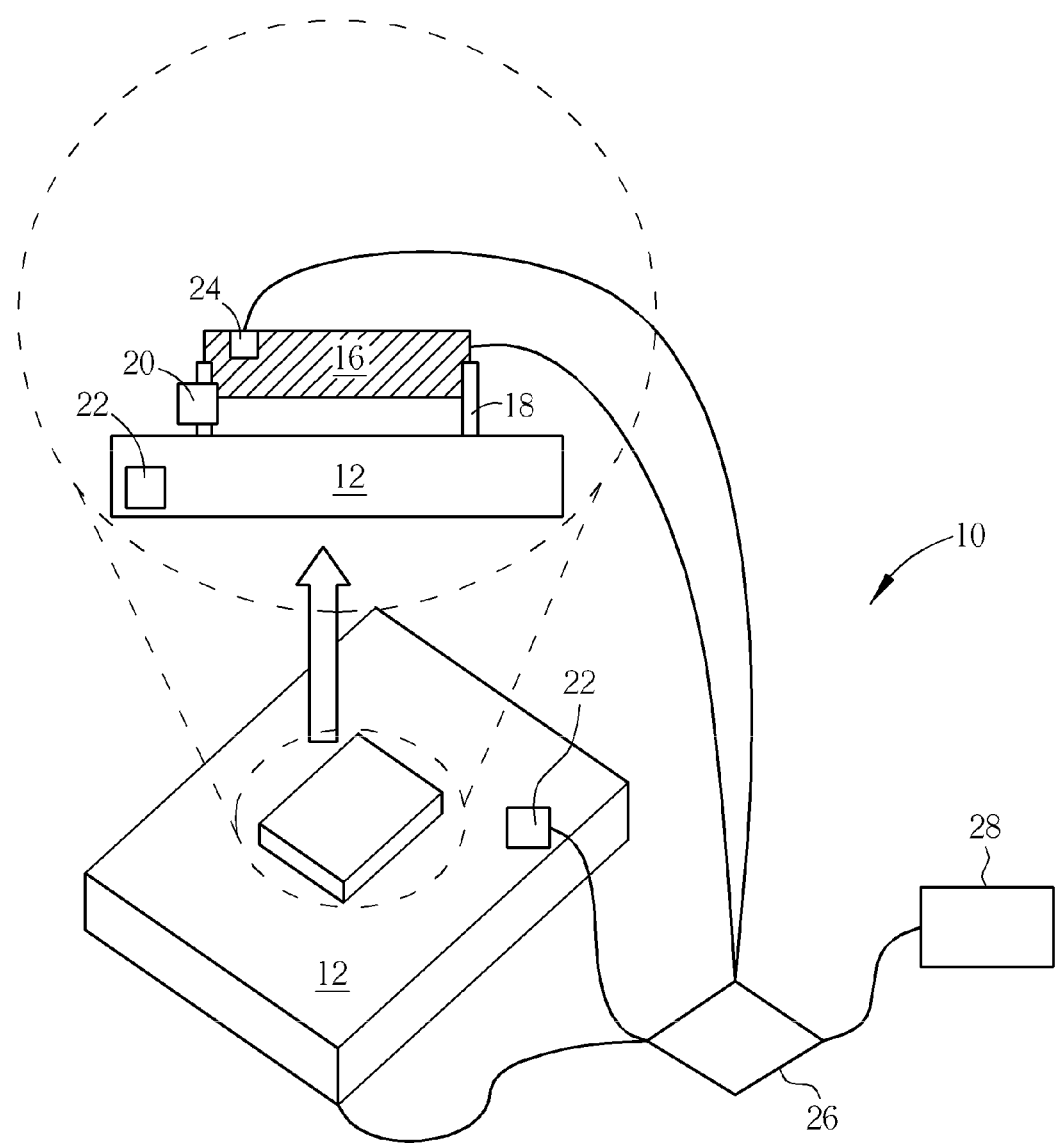

Please refer to FIG. 1 and FIG. 2. FIG. 1 and FIG. 2 are diagrams of a detecting system 10 in different periods according to an embodiment of the present invention. First, vibration test is executed by the detecting system 10 for a reference device (a multi-host device), so as to obtain related parameters, and the vibration test is executed again by the detecting system 10 for a target device (a single host device) according to the obtained vibration parameters, so that reliability of the single host vibration test can be preferable to the multi-host vibration test. The reference device can include a testing platform 12, a supporter 14 disposed on the testing platform 12, and a plurality of hosts 16 disposed on the supporter 14. The target device can include the testing platform 12, one host 16 and a frame 18. The testing platform 12 is for supporting the frame 18, and the host 16 is disposed on the frame 18. The detecting system 10 includes a first accelerometer 20, a second accelerometer 22, a third accelerometer 24, a data acquisition device 26 coupled to the first accelerometer 20, the second accelerometer 22 and the third accelerometer 24, and a processor 28 electrically connected to the data acquisition device 26.

When the vibration test is executed by the detecting system 10 for the reference device, the first accelerometer 20 is installed on the supporter 14 for detecting vibration frequency of the supporter 14. The second accelerometer 22 is installed on the testing platform 12 for detecting vibration frequency of the testing platform 12. The third accelerometer 24 is installed on the host 16 for detecting vibration frequency of the host 16. The data acquisition device 26 is for outputting an initial vibration frequency to the testing platform 12, and receiving parameters detected by the first accelerometer 20, the second accelerometer 22 and the third accelerometer 24. The processor 28 is for accessing a first parameter, a second parameter and a third parameter detected by the accelerometers, and transforming the parameters into the corresponding power spectrum density, such as a first power spectrum density, a second power spectrum density and a third power spectrum density.

Then, the vibration test is executed by the detecting system 10 for the target device according to above-mentioned power spectrum density, so as to obtain related parameters for the single host vibration test. Before the single host vibration test is executed, the first accelerometer 20 is installed on the frame 18 for detecting vibration frequency of the frame 18. The second accelerometer 22 is installed on the testing platform 12 for detecting vibration frequency of the testing platform 12. The third accelerometer 24 is disposed on the host 16 for detecting vibration frequency of the host 16. The data acquisition device 26 is for respectively outputting the first power spectrum density and the second power spectrum density to the frame 18 and the testing platform 12, and for selectively generating feedback according to data detected by the first accelerometer 20 and the second accelerometer 22, so as to ensure that the frame 18 and the testing platform 12 are vibrated according to the corresponding power spectrum density. The data acquisition device 26 is further for receiving a verification power spectrum density detected by the third accelerometer 24, and generating the verification power spectrum density conforming to design standard by comparing the third power spectrum density with the initial verification power spectrum density, so as to execute the single host vibration test.

Figure 3:
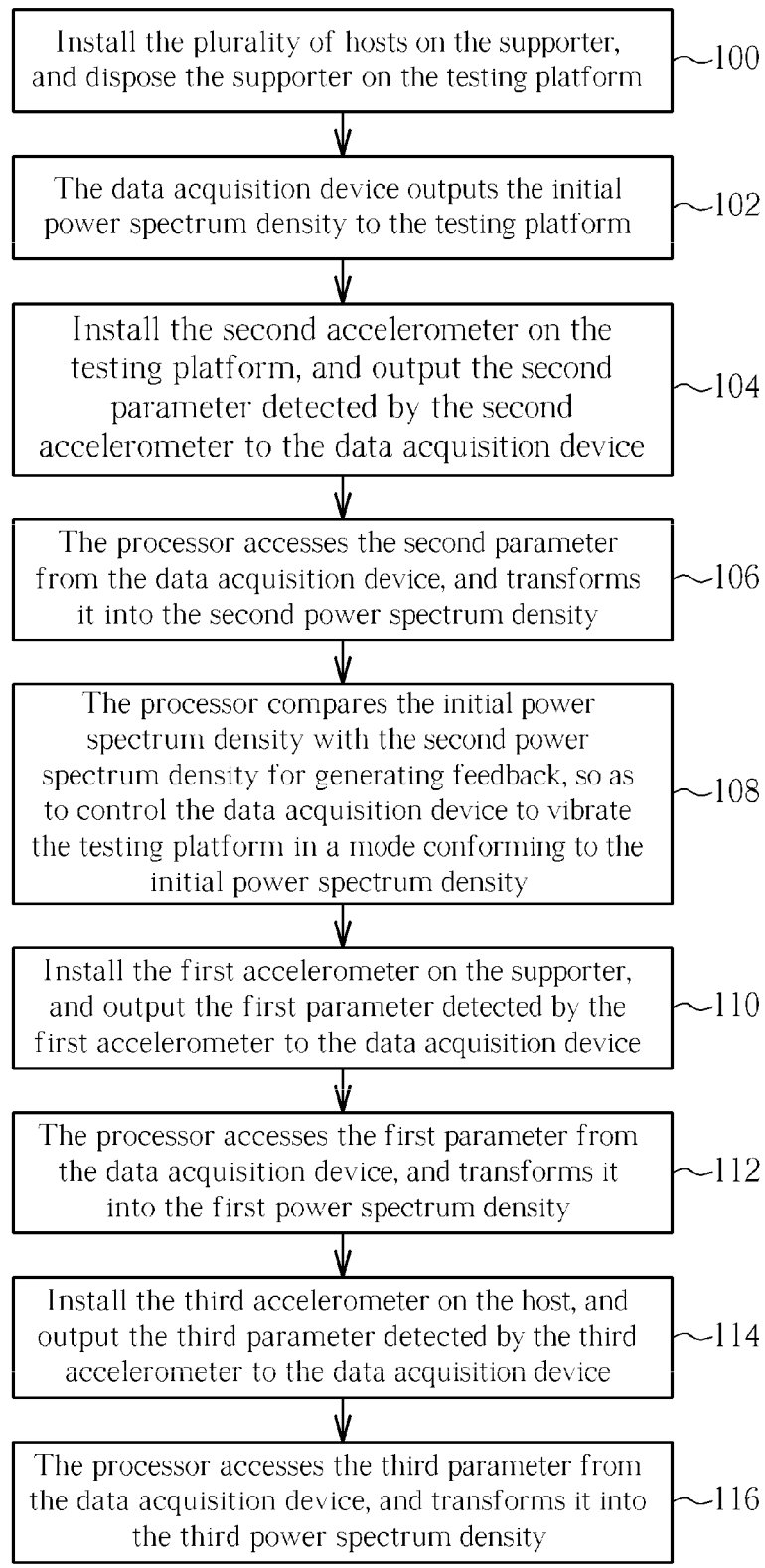
FIG. 3 is a flow chart of a method of vibration test in a first period according to the embodiment of the present invention.

Please refer to FIG. 3. FIG. 3 is a flow chart of a method of vibration test in a first period according to the embodiment of the present invention. The vibration test is executed for the supporter 14 with the plurality of hosts 16 in the first period of the method for obtaining the related parameters. The method includes:

Step 100: Install the plurality of hosts 16 on the supporter 14, and dispose the supporter 14 on the testing platform 12.

Step 102: The data acquisition device 26 outputs the initial power spectrum density to the testing platform 12.

Step 104: Install the second accelerometer 22 on the testing platform 12, and output the second parameter detected by the second accelerometer 22 to the data acquisition device 26.

Step 106: The processor 28 accesses the second parameter from the data acquisition device 26, and transforms the second parameter into the second power spectrum density.

Step 108: The processor 28 compares the initial power spectrum density with the second power spectrum density for generating feedback, so as to control the data acquisition device 26 to vibrate the testing platform 12 in a mode conforming to the initial power spectrum density.

Step 110: Install the first accelerometer 20 on the supporter 14, and output the first parameter detected by the first accelerometer 20 to the data acquisition device 26.

Step 112: The processor 28 accesses the first parameter from the data acquisition device 26, and transforms the first parameter into the first power spectrum density.

Step 114: Install the third accelerometer 24 on the host 16, and output the third parameter detected by the third accelerometer 24 to the data acquisition device 26.

Step 116: The processor 28 accesses the third parameter from the data acquisition device 26, and transforms the third parameter into the third power spectrum density, wherein the third power spectrum density is a function of the first power spectrum density and the second power spectrum density.

Figure 4:
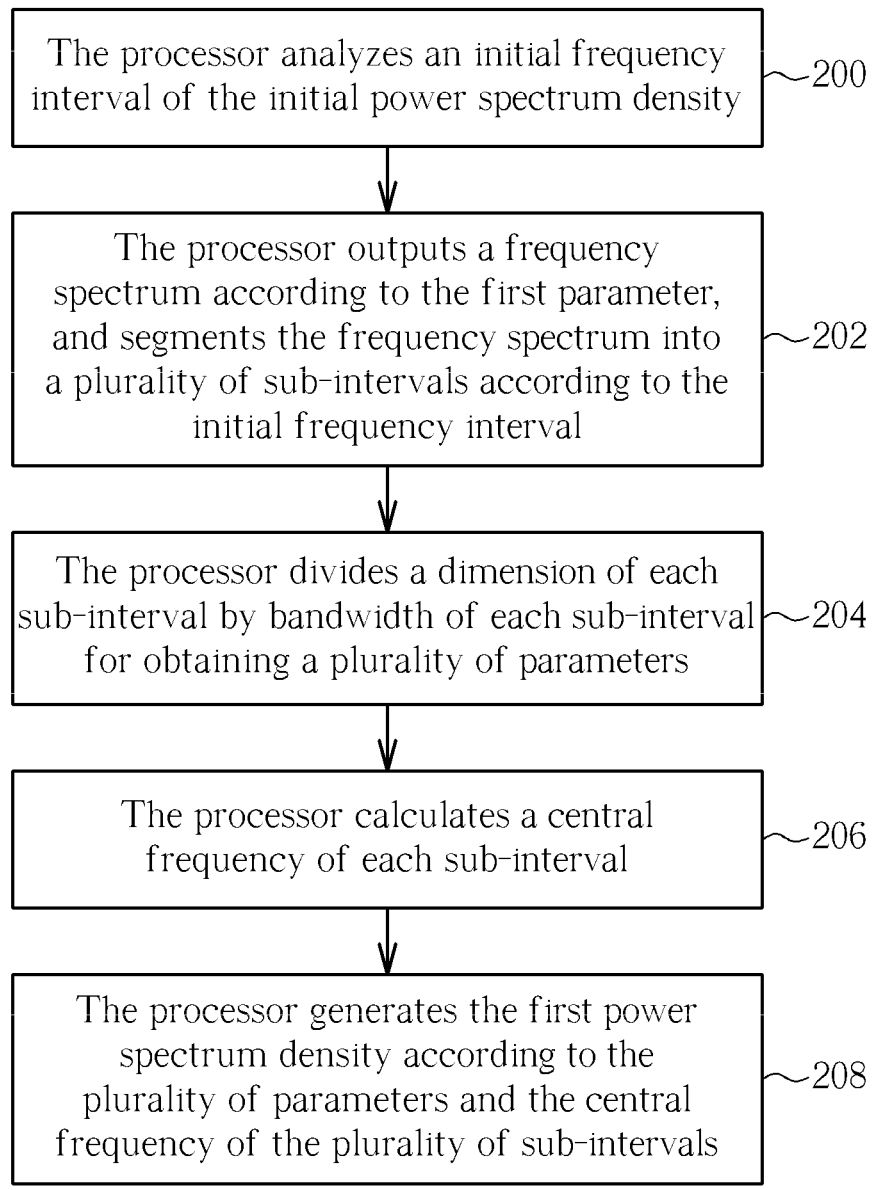
FIG. 4 is a flow chart of a method of function transformation according to the embodiment of the present invention.

Please refer to FIG. 4. FIG. 4 is a flow chart of a method of function transformation according to the embodiment of the present invention. The method of function transformation transforms the parameter into the power spectrum density, such as step 112 (or step 106 and step 116). The method includes:

Step 200: The processor 28 analyzes an initial frequency interval of the initial power spectrum density.

Step 202: The processor 28 outputs a frequency spectrum according to the first parameter, and segments the frequency spectrum into a plurality of sub-intervals according to the initial frequency interval.

Step 204: The processor 28 divides a dimension of each sub-interval by bandwidth of each sub-interval for obtaining a plurality of parameters.

Step 206: The processor 28 calculates a central frequency of each sub-interval.

Step 208: The processor 28 generates the first power spectrum density according to the plurality of parameters and the central frequency of the plurality of sub-intervals.

Figure 5:
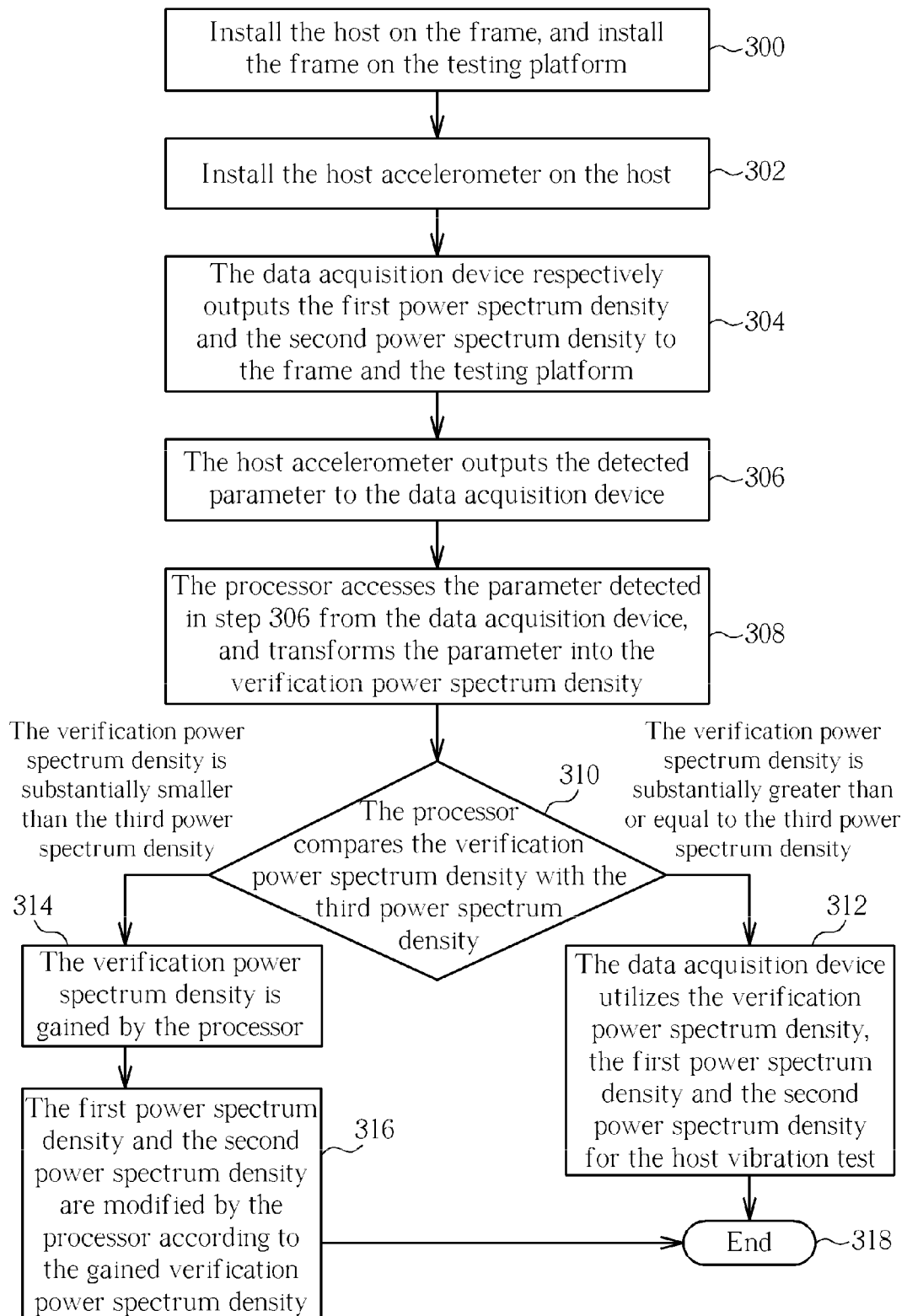
FIG. 5 is a flow chart of a method of the vibration test in a second period according to the embodiment of the present invention.

Please refer to FIG. 5. FIG. 5 is a flow chart of a method of the vibration test in a second period according to the embodiment of the present invention. The vibration test is executed for the frame 18 with one host 16 in the second period of the method by utilizing the parameters obtained in the first period. The method includes:

Step 300: Install one host 16 on the frame 18, and install the frame 18 on the testing platform 12.

Step 302: Install the host accelerometer (the third accelerometer 24) on the host 16.

Step 304: The data acquisition device 26 respectively outputs the first power spectrum density and the second power spectrum density to the frame 18 and the testing platform 12, so that the frame 18 and the testing platform 12 are vibrated according to the first power spectrum density and the second power spectrum density.

Step 306: The host accelerometer (the third accelerometer 24) outputs the detected parameter to the data acquisition device 26.

Step 308: The processor 28 accesses the parameter detected in step 306 from the data acquisition device 26, and transforms the parameter into the verification power spectrum density.

Step 310: The processor 28 compares the verification power spectrum density with the third power spectrum density, execute step 312 as the verification power spectrum density is substantially greater than or equal to the third power spectrum density; execute step 314 as the verification power spectrum density is substantially smaller than the third power spectrum density.

Step 312: The data acquisition device 26 utilizes the verification power spectrum density, the first power spectrum density and the second power spectrum density for the host vibration test, then execute step 318.

Step 314: The verification power spectrum density is gained by the processor 28, and execute step 316.

Step 316: The first power spectrum density and the second power spectrum density are modified by the processor 28 according to the gained verification power spectrum density, and execute step 310.

Step 318: End.

Detailed description of the method is introduced as follows. In the first period of the vibration test, the first accelerometer 20, the second accelerometer 22 and the third accelerometer 24 are respectively disposed on the supporter 14, the testing platform 12 and the host 16. First, the second accelerometer 22 outputs the detected second parameter to the data acquisition device 26. The processor 28 accesses the second parameter from the data acquisition device 26, and transforms the second parameter into the second power spectrum density. The processor 28 can generate feedback by comparing the initial power spectrum density with the second power spectrum density, so as to ensure that the testing platform 12 can be vibrated in a mode conforming to the initial power spectrum density. After the above-mentioned procedure is finished, the first accelerometer 20, the second accelerometer 22 and the third accelerometer 24 respectively output the detected first parameter, the second parameter and the third parameter to the data acquisition device 26, so that the processor 28 can access the parameters from the data acquisition device 26, and transform the parameters into the corresponding power spectrum density.

For example, the processor 28 analyzes the initial frequency interval of the initial power spectrum density (value of the interval is arbitrary). Then, the processor 28 generates the frequency spectrum according to the first parameter detected by the first accelerometer 20, such as generating a spectrum illustrating time versus acceleration square per hertz, and segments the frequency spectrum into the plurality of sub-intervals according to the initial frequency interval. After calculating the dimension of each sub-interval on the frequency spectrum by the processor 28, the dimension of each sub-interval is divided by the bandwidth of each sub-interval for obtaining the plurality of parameters. In addition, the processor 28 calculates the central frequency of each sub-interval, and generates the first power spectrum density according to the plurality of parameters and the central frequency of the plurality of sub-intervals. Because the supporter 14 and the host 16 are installed on the testing platform 12, the first power spectrum density, the second power spectrum density and the third power spectrum density are direct proportion, which means the third power spectrum density can be the function of the first power spectrum density and the second power spectrum density. Therefore, the detecting system 10 can utilize the first power spectrum density, the second power spectrum density and the third power spectrum density to execute the second period of the vibration test.

In the second period of the vibration test, the first accelerometer 20, the second accelerometer 22 and the third accelerometer 24 (the host accelerometer) are respectively installed on the frame 18, the testing platform 12 and the host 16. The data acquisition device 26 respectively outputs the first power spectrum density and the second power spectrum density to the frame 18 and the testing platform 12, so as to vibrate the frame 18 and the testing platform 12 according to the first power spectrum density and the second power spectrum density. Then, the third accelerometer 24 outputs the detected parameter to the data acquisition device 26. The processor 28 accesses the parameter from the data acquisition device 26, and transforms the parameter into the verification power spectrum density. Because the structural difference between the reference device and the target device is the carrier (such as the supporter 14 or the frame 18) disposed on the testing platform 12 for supporting the host 16, the detecting system 10 can utilize the processor 28 to compare the verification power spectrum density with the third power spectrum density for executing the single host vibration test. As the verification power spectrum density is substantially greater than the third power spectrum density, the verification power spectrum density, the modified first power spectrum density and the modified second power spectrum density conforming to the verification power spectrum density can be applied on the target device (the single host device includes the testing platform 12, the host 16 and the frame 18), so as to acquire preferable reliability than the reference device.

Therefore, when the verification power spectrum density is substantially greater than or equal to the third power spectrum density, the data acquisition device 26 can utilize the verification power spectrum density, the first power spectrum density and the second power spectrum density to be applied reference in the second period of the host vibration test. On the other hand, when the verification power spectrum density is substantially smaller than the third power spectrum density, the verification power spectrum density is gained by the processor 28, such as the verification power spectrum density is multiplied by 1.1, and stops gaining until the gained verification power spectrum density is greater than or equal to the third power spectrum density. Meanwhile, the first power spectrum density and the second power spectrum density are modified according to above-mentioned function, and the gained verification power spectrum density, the modified first power spectrum density and the modified second power spectrum density can be utilized in the second period of the host vibration test.

In conclusion, the power spectrum density is varied by different paths in the first period of the vibration test. When the data acquisition device outputs the initial power spectrum density (which is equal to the second power spectrum density by feedback) to the testing platform, the power spectrum density reacted from the supporter and the host are different from the initial power spectrum density, and can respectively be the first power spectrum density and the third power spectrum density. The third power spectrum density can be proportional to the first power spectrum density and the second power spectrum density, so the first power spectrum density and the third power spectrum density are amplified accordingly as the initial power spectrum density (the second power spectrum density) is amplified, and the first power spectrum density and the third power spectrum density are reduced accordingly as the initial power spectrum density (the second power spectrum density) is reduced. Thus, functions of the first power spectrum density, the second power spectrum density and the third power spectrum density can be generated in the first period of the vibration test by the detecting system. Then, parameters for the single host vibration test can be generated in the second period of the vibration test by the detecting system for simplifying follow procedures of the vibration test. The target device includes the frame with one host, and the frame is disposed on the testing platform. The data acquisition device respectively outputs the first power spectrum density and the second power spectrum density to the frame and the testing platform for simulating a situation of the reference device (the supporter and the testing platform), and for detecting the power spectrum density (the verification power spectrum density) reacted from the host. Final, the detecting system can determine whether the first power spectrum density and the second power spectrum density detected in the first period can be utilized in the follow procedures of the single host vibration test by comparing the verification power spectrum density (which is detected from the host in the second period of the vibration test) with the third power spectrum density (which is detected from the host in the first period of the vibration test).

As the verification power spectrum density is substantially greater than (or equal to) the third power spectrum density, the first power spectrum density and the second power spectrum density can be utilized for the single host vibration test. As the verification power spectrum density is substantially smaller than the third power spectrum density, reliability of the host in the second period can not be the same as the reliability in the first period, so that the verification power spectrum density is gained until the gained verification power spectrum density is greater than the third power spectrum density. At this time, the first power spectrum density and the second power spectrum density detected in the first period are modified accordingly (which is amplified normally), so that the second period of the vibration test can be executed by utilizing the gained verification power spectrum density, the modified first power spectrum density and the modified second power spectrum density, so as to simulate the situation in the first period for preferable reliability of the host vibration test than the initial design efficiency.

Comparing to the prior art, the present invention can execute the vibration test for single host, and accurately simulate the situation the same as the multi-host vibration test (the rack with the plurality of hosts) by analyzing and comparing the corresponding power spectrum density for preferable reliability. That is to say, the vibration test of the present invention can be executed for the single host in the simulating situation as the supporter with the plurality of hosts, so the complicated procedures and labor work of conventional installation are omitted. Thus, the detecting system for the single host vibration test and the related method of the present invention can effectively simplify apparatus design and reduce testing period, and has advantages of greater efficiency and low production cost.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for host vibration test, comprising:
    outputting an initial power spectrum density to a testing platform by a data acquisition device so as to vibrate the testing platform according to the initial power spectrum density;
    generating a first power spectrum density according to data detected by a first accelerometer disposed on a supporter, wherein the supporter is disposed on the testing platform;
    generating a second power spectrum density according to data detected by a second accelerometer disposed on the testing platform;
    outputting the first power spectrum density and the second power spectrum density respectively to a frame and the testing platform to generate a verification power spectrum density of a host on the frame, wherein the frame is disposed on the testing platform; and
    utilizing the verification power spectrum density to generate a host testing power spectrum density for the vibration test of single host.

2. The method of claim 1, further comprising:
generating a third power spectrum density according to data detected by the third accelerometer disposed on a host, wherein the host is disposed on the supporter.

3. The method of claim 2, wherein the third power spectrum density is a function of the first power spectrum density and the second power spectrum density.

4. The method of claim 1, wherein generating the first power spectrum density according to data detected by the first accelerometer comprises:
outputting a first parameter detected by the first accelerometer to the data acquisition device; and
transforming the first parameter into the first power spectrum density from the data acquisition device by a processor.

5. The method of claim 4, wherein transforming the first parameter into the first power spectrum density from the data acquisition device by the processor comprises:
analyzing an initial frequency interval of the initial power spectrum density;
outputting a frequency spectrum according to the first parameter and segmenting the frequency spectrum into a plurality of sub-intervals according to the initial frequency interval;
dividing a dimension of each sub-interval by bandwidth of each sub-interval for obtaining a plurality of parameters;
calculating a central frequency of each sub-interval; and
generating the first power spectrum density according to the plurality of parameters and the central frequency of the plurality of sub-intervals.

6. The method of claim 1, further comprising:
outputting a second parameter detected by the second accelerometer to the data acquisition device;
transforming the second parameter into the second power spectrum density from the data acquisition device by a processor; and
comparing the initial power spectrum density with the second power spectrum density for generating feedback by the processor, so as to control the data acquisition device to drive the testing platform in a mode conforming to the initial power spectrum density.

7. The method of claim 1, wherein outputting the first power spectrum density and the second power spectrum density respectively to the frame and the testing platform to generate the verification power spectrum density of the host on the frame comprises:
outputting the first power spectrum density to the frame disposed on the testing platform by the data acquisition device so that the frame and the host disposed on the frame are vibrated according to the first power spectrum density;
outputting the second power spectrum density to the testing platform by the data acquisition device so that the testing platform is vibrated according to the second power spectrum density; and
generating a the verification power spectrum density according to a data detected by a host accelerometer disposed on the host; and
utilizing the verification power spectrum density to generate the host testing power spectrum density for the vibration test of single host comprises:
comparing the verification power spectrum density with a third power spectrum density; and
generating the host testing power spectrum density according to a comparison.

8. The method of claim 7, wherein generating the verification power spectrum density according to the data detected by the host accelerometer disposed on the host comprises:
outputting a parameter detected by the host accelerometer to the data acquisition device; and
transforming the parameter into the verification power spectrum density from the data acquisition device by a processor.

9. The method of claim 7, wherein comparing the verification power spectrum density with the third power spectrum density comprises:
the verification power spectrum density being the host testing power spectrum density when the verification power spectrum density is substantially greater than or equal to the third power spectrum density.

10. The method of claim 7, wherein comparing the verification power spectrum density with the third power spectrum density comprises:
gaining the verification power spectrum density when the verification power spectrum density is substantially smaller than the third power spectrum density;
modifying the first power spectrum density and the second power spectrum density according to the verification power spectrum density which is gained; and
comparing the gained verification power spectrum density with the third power spectrum density.

11. A detecting system for host vibration test, comprising:
a first accelerometer installed on a frame for detecting vibration frequency of the frame;
a second accelerometer installed on a testing platform for detecting vibration frequency of the testing platform, and the frame being disposed on the testing platform;
a third accelerometer installed on a host for detecting vibration frequency of the host, and the host being disposed on the frame;
a data acquisition device coupled to the first accelerometer, the second accelerometer and the third accelerometer for respectively outputting a first power spectrum density and a second power spectrum density to the frame and the testing platform; and
a processor electrically connected to the data acquisition device for controlling the data acquisition device to respectively drive the frame and the testing platform according to data detected by the first accelerometer and the second accelerometer, and further for comparing a third power spectrum density detected by the third accelerometer with a verification power spectrum density, and executing a host vibration test according to a comparison.

12. The detecting system of claim 11, wherein the first accelerometer is further installed on a supporter, the second accelerometer is further installed on the testing platform with the supporter, and the first accelerometer and the second accelerometer respectively generate the first power spectrum density and the second power spectrum density via the data acquisition device.

13. The detecting system of claim 12, wherein the third power spectrum density is a function of the first power spectrum density and the second power spectrum density.

14. The detecting system of claim 11, wherein the processor is further for transforming data detected by the first accelerometer, the second accelerometer and the third accelerometer into the corresponding power spectrum density from the data acquisition device.

15. The detecting system of claim 11, wherein the processor is further for controlling the data acquisition device to output the verification power spectrum density for being a host testing power spectrum density when the verification power spectrum density is substantially greater than or equal to the third power spectrum density.

16. The detecting system of claim 11, wherein the processor is further for gaining the verification power spectrum density and for modifying the first power spectrum density and the second power spectrum density accordingly when the verification power spectrum density is substantially smaller than the third power spectrum density.

17. A method for host vibration test, comprising:
- outputting an initial power spectrum density to a testing platform by a data acquisition device so as to vibrate the testing platform according to the initial power spectrum density;
- outputting a first parameter detected by the first accelerometer to the data acquisition device;
- analyzing an initial frequency interval of the initial power spectrum density;
- outputting a frequency spectrum according to the first parameter and segmenting the frequency spectrum into a plurality of sub-intervals according to the initial frequency interval;
- dividing a dimension of each sub-interval by bandwidth of each sub-interval for obtaining a plurality of parameters;
- calculating a central frequency of each sub-interval; and
- generating a first power spectrum density according to the plurality of parameters and the central frequency of the plurality of sub-intervals;
- generating a second power spectrum density according to data detected by a second accelerometer disposed on the testing platform; and
- executing the vibration test of a host according to the first power spectrum density and the second power spectrum density by the data acquisition device.

18. The method of claim 17, further comprising:
- generating a third power spectrum density according to data detected by the third accelerometer disposed on a host, wherein the host is disposed on the supporter.

19. The method of claim 18, wherein the third power spectrum density is a function of the first power spectrum density and the second power spectrum density.

* * * * *